United States Patent

Davis et al.

[15] 3,668,440

[45] June 6, 1972

[54] TEMPERATURE STABLE MONOLITHIC MULTIPLIER CIRCUIT

[72] Inventors: Walter Richard Davis, Tempe; James E. Solomon, Phoenix, both of Ariz.

[73] Assignee: Motorola, Inc., Franklin Park, Ill.

[22] Filed: Oct. 16, 1970

[21] Appl. No.: 81,399

[52] U.S. Cl...............................307/310, 307/229, 328/160
[51] Int. Cl...............................H03k 17/14
[58] Field of Search..............................307/229, 310; 328/160

[56] References Cited

UNITED STATES PATENTS

| | | | |
|---|---|---|---|
| 3,579,272 | 5/1971 | Foss | 307/310 |
| 3,344,283 | 9/1967 | Stubbs | 307/310 |
| 2,991,424 | 7/1961 | Wolfendale | 307/310 |
| 2,871,376 | 1/1959 | Kretzmer | 307/310 |
| 3,448,297 | 6/1969 | Rhodes | 328/160 |

*Primary Examiner*—John S. Heyman
*Assistant Examiner*—Harold A. Dixon
*Attorney*—Mueller & Aichele

[57] ABSTRACT

A monolithic four-quadrant multiplier circuit, the output off which is subject to variations caused by changes in beta ($\beta$) due to changes in temperature, is temperature compensated by providing operating current thereto from a regulating circuit which causes the operating current for the multiplier to vary in accordance with a predetermined alpha ($\alpha$) relationship to cancel out the effect of changes in $\beta$ on the multiplier output. A level shifting circuit is connected to the output of the multiplier and causes the output of the multiplier to be referenced to ground. In addition, the level shifting circuit includes roll-off filter circuits to prevent high frequency signals from passing to the output terminals over paths which would subject the signals to large amounts of phase shift.

17 Claims, 1 Drawing Figure

PATENTED JUN 6 1972 3,668,440
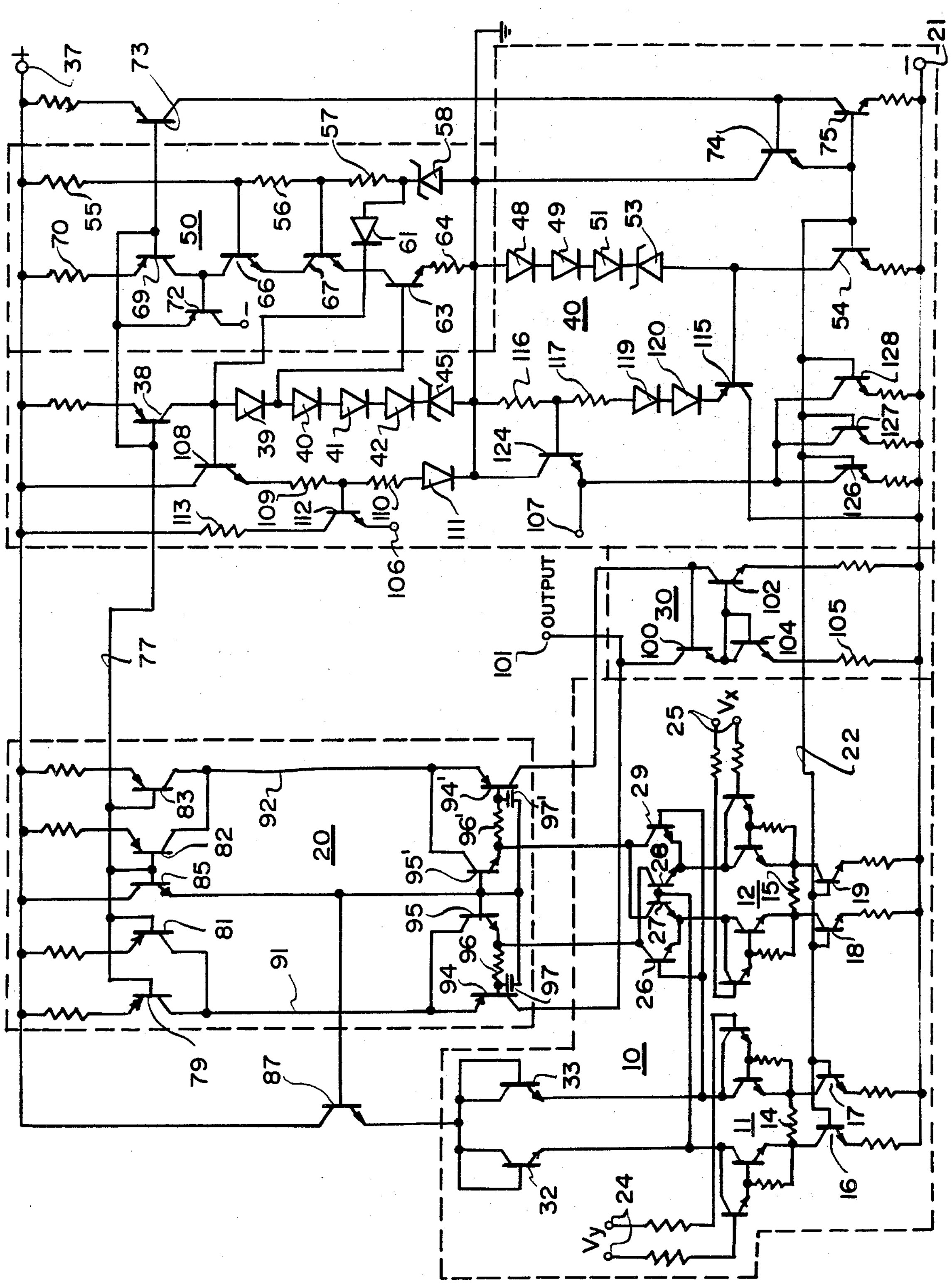
INVENTORS.
WALTER RICHARD DAVIS
JAMES E. SOLOMON
BY Mueller & Aichele
ATTORNEYS.

TEMPERATURE STABLE MONOLITHIC MULTIPLIER CIRCUIT

BACKGROUND OF THE INVENTION

A large number of applications exist for a monolithic integrated circuit four-quadrant multiplier designed for uses where the output voltage is a linear product of two input voltages. Typical applications include multiplying, dividing, square root, mean square, phase detector, frequency doubler, balanced modulator/demodulator, electronic gain control, or the like, with the particular function employed depending upon the nature of the input signals and the nature of the external connections made to the multiplier circuit. In most of the applications with which such a multiplier may be utilized, it is desirable to provide a circuit subject to minimum variation due to changes in the ambient temperature and changes in the operating potential applied to the circuit, since any variations which are introduced in this manner are reflected as variations in the product output of the multiplier. Such output variations are operational errors which are intolerable for many applications of the multiplier circuits.

A basic monolithic multiplier capable of performing the above functions depends upon the exponential relationship of the collector current of a transistor to its base-emitter voltage. The multiplication takes place in a pair of differential amplifiers having cross-coupled collectors, with one input voltage being converted to a current by a first input differential amplifier and being fed into the emitters of the cross-coupled transistors.

The other input voltage also is converted to a current by a second input differential amplifier. This current, however, is converted to an exponential voltage by diode-connected transistors supplying current to the collectors of the second input differential amplifier. The exponential voltage then is fed to the bases of the cross-coupled transistors where, due to the previously mentioned exponential relationship, the resultant collector current is proportional to the product of the two voltages. The output signal, however, has been found to be dependent upon the beta ($\beta$) of the cross-coupled output transistors, where beta is the current gain of these transistors. Because beta changes with temperature, a significant error can be introduced into the output signal due to changes in the ambient temperature in which the multiplier is being operated.

In addition since the collectors of the output transistors of the multiplier are at a higher potential than ground potential, some form of level shifting must be used if the circuit is to be ground-referenced.

SUMMARY OF THE INVENTION

Accordingly it is an object of this invention to provide an improved monolithic multiplier.

It is another object of this invention to provide temperature compensation for a monolithic multiplier.

It is an additional object of this invention to supply a temperature compensated operating current for a monolithic multiplier in order to cancel the effects caused by changes in beta in the transistors of the monolithic multiplier due to variations in temperature.

It is a further object of this invention to provide a monolithic multiplier circuit with a level-shift circuit having high frequency roll-off filters therein to prevent signals from being applied to the output terminals through paths which otherwise subject the signals to a large amount of phase-shift.

In accordance with a preferred embodiment of this invention, a monolithic integrated circuit multiplier circuit includes a pair of differential amplifiers including first, second, third and fourth transistors with the emitters of the first and second transistors being connected at a common point to form a first input terminal and with the emitters of the third and fourth transistors being connected to a common point to form a second input terminal. A first input voltage is converted to current and is applied to the first and second input terminals. Similarly, the bases of the third and fourth transistors are interconnected to provide a third input terminal, with the bases of the second and third transistors being interconnected to provide a fourth input terminal. A second input voltage is converted to an exponential voltage and is applied to these third and fourth input terminals. The collectors of the transistors in the first and second differential amplifiers are cross-coupled and are connected to a level shifting circuit which provides the output for the multiplier. The level shifting circuit includes roll-off filters therein to prevent the passage of high frequency signals through the base-emitter paths of output transistors in the level shifting circuit to stabilize the operation of the system and to prevent the passage of signals through these paths which introduce a large phase-shift therein.

The output of the first and second differential amplifiers, forming the product output of the circuit, is subject to variations due to variations in beta of the amplifier transistors with variations in the temperature with which the circuit is operated. In order to offset such variations, the current supplied to the multiplier circuit is obtained from a regulating circuit which varies the current in accordance with variations in alpha ($\alpha$) of a number of series-connected transistor emitter-collector paths, connected in series with a current source across a source of operating potential. The number of series-connected collector-emitter paths in the alpha compensation circuit is selected to cause variations in the operating current for the multiplier circuit which substantially offset variations in the output produced by changes in beta of the transistors in the multiplier.

BRIEF DESCRIPTION OF THE DRAWING

The sole FIGURE of the drawing is directed to a circuit diagram of an integrated circuit monolithic multiplier in accordance with a preferred embodiment of this invention.

DETAILED DESCRIPTION

Referring now to the drawing, there is shown a schematic diagram of a circuit suitable for implementation as a monolithic integrated circuit and which may be fabricated as an independent integrated circuit or as part of a larger array involving other circuits performing other functions. Although all of the components shown in the drawing are formed as part of the same monolithic integrated circuit, these components have been outlined by dotted lines into different functional blocks corresponding to the particular manner in which the various portions of the circuit operate.

Briefly these different functional areas of the circuit are a basic multiplier 10, which multiplies two input signals together to form a single output product signal therefrom. The output product signal from the multiplier 10 is supplied to a level shift circuit 20 which references the output signal of the multiplier 10 to ground. The level-shifted signal obtained from the output of the level shift circuit 20 then is supplied to a differential-to-single-ended converter 30 which provides single-ended output signals from the circuit for utilization by external components, not shown.

In order to provide operating potential stablilized against variations in the unregulated voltage supplies available for operating the circuit, a voltage regulator 40 also is provided and supplies regulated operating potential for operating the various components of the circuit shown in the drawing. The output of the multiplier shown in block 10 is subject to variations with variations in the beta of the transistors used, so that an alpha compensation block 50 also is provided to cause variations in the current supplied to the multiplier block 10 with the variations being in accordance with variations of alpha of integrated circuit transistors with temperature and being of a magnitude to offset or cancel the output variations caused by variations of beta of the multiplier transistors with temperature.

The multiplier 10 is a conventional monolithic four-quadrant multiplier such as the Motorola MC 1495L multiplier circuit, or the like. This multiplier circuit includes a pair of input differential amplifier circuits 11 and 12 each including two pairs of cascaded emitter-follower coupled transistors. The emitters of the innermost or output transistors of the differential amplifiers 11 and 12 are connected to opposite ends of emitter degeneration resistors 14 and 15, respectively, for limiting the effects of nonlinear base-emitter voltage variation from the operation of the input amplifiers. The emitters of the output transistors of the differential amplifiers 11 and 12 also each are separately connected to the collector of a different NPN current source transistor 16, 17, 18 and 19, the emitters of which are connected through emitter resistors to a negative potential bonding pad 21, and the bases of which all are provided with a source of biasing or operating potential over a lead 22 from the regulating circuit 40.

Input signals for the differential amplifier 11 are coupled to the bases of the input transistors of the amplifier at a pair of input terminals 24, with these input signals being designated $V_y$. Similarly, input signals for the differential amplifier 12 are coupled to the bases of the input transistors of the amplifier at a pair of input terminals 25, and these input signals are designated $V_x$.

In order to provide multiplication of the input signals applied to the differential amplifiers 11 and 12, a further pair of differential amplifiers comprising NPN transistors 26, 27 and 28 29, respectively, are provided, with the emitters of the transistors 26 and 27 being coupled together and to the collector of one of the output transistors of the differential amplifier 12. The collector of the other output transistor of the differential amplifier 12 is connected to the interconnected emitters of the transistors 28 and 29, forming the second multiplier differential amplifier. Thus, the input voltage $V_x$ applied to the input terminal 25 is converted to a current by the differential amplifier 12 and is fed into the emitters of the transistors 26, 27, 28 and 29.

The other input voltage $V_y$, applied to the input terminals 24, also is converted into a current by the differential amplifier 11. The collectors of the output transistors of this differential amplifier, however, are supplied with current through a pair of transistor diodes 32 and 33, formed from NPN transistors with the collector-base junctions shorted, which cause the output current of the amplifier 11 to be converted into an exponential voltage. This voltage is then connected to the bases of the transistors 26, 27, 28 and 29, with the collector of one of the output transistors of the differential amplifier 11 being connected to the bases of the transistors 27 and 28, and with the collector of the other output transistor of the differential amplifier 11 being connected to the bases of the transistors 26 and 29.

Outputs from the multiplier differential amplifiers 26, 27 and 28, 29 are obtained by cross-coupling the collectors of the transistors 26 and 28 to form one of the outputs and by cross-coupling the collectors of the transistors 27 and 29 to form the other of the outputs. A differential output voltage, $V_o$, may be produced between these outputs if each output is connected through a load resistor $R_L$ to a positive source of voltage. The output voltage, $V_o$, produced across these two outputs may be mathematically derived and is given by the equation:

$$V_o = (2R_L)/(R_{14}\, R_{15}\, I_1)\ (\beta)/(\beta+3)\ V_x\, V_y$$

where $R_L$ is the load resistor, $R_{14}$ and $R_{15}$ correspond to the emitter resistors 15 and 14, respectively, $I_1$ is the current through either of the diode-connected transistors 32 or 33, and $\beta$ is the current gain of the four cross-coupled transistors 26, 27, 28, and 29. Typically, the value of $\beta$ is 100 or so.

Since $\beta$ is subject to changes with temperature, a significant error can result in any multiplication producing an output voltage $V_o$ due to the $\beta/(\beta+3)$ term. As a consequence, it is desirable to cause the current $I_1$ to be made proportional to $\beta/(\beta+3)$ so that this temperature dependent term can be eliminated from the equation.

In order to provide such a variation in the current term $I_1$, and further in order to cause the operation of the circuit to be independent of variations in the supply voltage, the voltage regulator 40 and the alpha compensation circuit 50 are provided. The voltage regulator 40 provides regulated voltages above and below ground and is connected between the bonding pad 21, connected to a source of negative of potential (not shown), and a bonding pad 37, connected to a source of positive potential (not shown), with an intermediate point between the bonding pads 21 and 37 being connected to ground.

Basically, the regulated voltage for the positive portion of the circuit between the bonding pad 37 and ground is provided by a divider including a lateral PNP current source transistor 38, the emitter of which is connected through a suitable emitter resistor to the bonding pad 37, and the collector of which is connected in series with four diodes 39, 40, 41, 42 (which may be transistor diodes similar to the diodes 32 and 33) and a zener diode 45 to ground. With the current flowing through the diode string 39 to 42 and 45 being supplied from the current source transistor 38, the high dynamic impedance of the transistor 38 tends to swamp out any variations in the dynamic impedance of the zener diode 45. Thus, a highly stabilized voltage appears across the diodes 39 to 45 even though the potential applied to the bonding pad 37 may vary over a substantial range. In addition, the diodes 39 to 42 have a temperature coefficient opposite to that of the zener diode 45, with two of these temperature compensating the zener 45.

Similarly, a regulated or stabilized voltage for the negative portion of the circuit is provided by connecting a string of diodes 48, 49 and 51 and a zener diode 53 between ground and an NPN current source transistor 54 the emitter of which is connected through a suitable emitter resistor to the negative supply bonding pad 21. The potential developed across the diodes 48 to 51 and the zener diode 53 similarly is a highly stable reference potential over a wide range of variations in the potential applied to the bonding pad 21, with two of the diodes 48–51 also providing temperature compensation for the zener diode 53.

The zener diodes 45 and 53 are provided with operating current from current sources in the form of the transistors 38 and 54, which in turn are referenced to the voltage developed across the zener diode 45. Under this set of operating conditions, it is possible that upon initial application of operating potential to the bonding pads 37 and 21, the circuit would fail to start or operate due to a failure of the current source transistors 38 or 54 to conduct current through the respective divider circuits including the zener diodes 45 and 53. In such an event no operation of the circuit could take place.

In order to insure that the circuit commences operation once an operating potential is applied to the bonding pads 37 and 21, an additional voltage divider in the form of three resistors 55, 56 and 57 is connected in series with a zener diode 58 between the bonding pad 37 and ground. Since there is no current source in this series voltage divider, current initially flows through the resistors 55, 56 and 57 and through the zener diode 58 to establish a predetermined potential across the zener diode 58. This potential is applied to the anode of a diode 61, the cathode of which is connected to the junction of the collector of the transistor 38 and the diode 39.

With the transistor 38 initially being nonconductive, the diode 61 conducts to cause current to flow through the diode 61 and the diodes 39 to 42 and zener diode 45, causing a predetermined voltage drop to occur across this portion of the circuit. This voltage drop is applied to the base of an NPN current source transistor 63 which commences conduction to supply current through a resistor 64 connected between the emitter of the transistor 63 and ground. Temperature compensation for the base-emitter junction of the transistor 63 is provided by the diode 40 so that the voltage on the emitter of the transistor 63 is stable.

The current flowing through the emitter resistor 64 is established by the magnitude of the resistor 64 and the stable voltage appearing across two forward-biased diode junctions (41 and 42) and the zener diode 45, which is the same stable voltage appearing on the emitter of the transistor 63 with the geometries of the diode 40 and the transistor 63 being matched. This current also flows through the collector circuit of the transistor 63, with the collector current $I_C$ being related to the emitter current $I_E$ of the transistor 63 by the factor of alpha: $I_C = \alpha I_E$. The collector current $(\alpha I_E)$; is the emitter current of an NPN transistor 67, the base of which is connected to the junction of the resistors 55 and 56; so that the transistor 67 is forward biased into conduction. Thus, the collector current of the transistor 67 is $\alpha(\alpha I_E)$ or $\alpha^2 I_E$. By a similar analysis, it can be shown that the collector current of the transistor 66 then must equal $\alpha^3 I_E$. This collector current of the transistor 66 is supplied from to the collector of a lateral PNP current source transistor 69, the emitter of which is connected through a resistor 70 to the bonding pad 37. Temperature compensation for the base-emitter junction of the transistor 63 is provided by one of the diodes 40 to 42.

In order to insure that current flows through the current source transistor 69 and resistor 70 to the series connected NPN transistors 66, 67 and 63, the junction between the collectors of the transistors 69 and 66 is connected to the base of a substrate PNP transistor 72, the collector of which is connected to the substrate which in turn is coupled with the source of negative operating potential. The emitter of the substrate PNP transistor 72 is connected to the base of the lateral PNP current source transistor 69, and operates as part of a feedback pair with the transistor 69. In this circuit configuration, the substrate PNP transistor 72 operates as a shunt feedback for the lateral PNP transistor 69, establishing the potential on the base of the transistor 69 causing current conduction to take place therethrough to establish the current of $\alpha^3 I_E$ on the collector of the transistor 69.

Due to the fact that the total current flowing in the series circuit consisting of the resistor 70 and the transistors 69, 66, 67 and 63 is established by the regulated reference potential across the diodes 40 to 42 and the zener diode 45, a constant current flows through this circuit, with the current drawn by the PNP current source transistor 69 also being a constant current. The emitter of the substrate PNP transistor 72 also is connected to the bases of six other lateral PNP current source transistors, including the current source transistor 38 which supplies current to the zener diode 45.

With the current source transistor 38 then forward biased into conduction by the predetermined potential established by the emitter of the substrate PNP transistor 72, current commences flowing through the resistor and the diodes 39 to 42 and zener diode 45 from the current source transistor 38. This causes the regulating zener diode 45 to be conductive and to be held conductive, so that the potentials at both ends of the shunt diode 61 are substantially the same. The diode 61 is therefore rendered ineffective and the circuit operates as if it were no longer present.

In order to insure that current flows through the zener diode 53 in the negative portion of the circuit, a lateral PNP current source transistor 73 has the base thereof connected to the emitter of the substrate PNP transistor 72 and is rendered conductive along with the transistors 38 and 69. Conduction of the transistor 73 establish a predetermined potential on the base of an NPN transistor 74 connected in a shunt feedback relationship with an NPN current source transistor 75, the emitter of which is connected to the negative terminal bonding pad 21, and the collector of which is connected to the collector of the lateral PNP transistor 73. The transistors 74 and 75 operate in a manner similar to the manner in which the transistor 72 operates in conjunction with the transistors 38, 69 and 73 to establish conduction of the current source transistor, 75.

Similarly, the transistor 74 establishes operation of the current source transistor 54, causing current to be drawn therethrough and through the diode string including the diodes 48, 49 and 51 and the zener diode 53. At the same time, a potential is established on the lead 22 to cause operation of the current source transistors 16, 17, 18 and 19 in the multiplier portion of the circuit.

The emitter of the transistor 72 also is coupled over a lead 77 to four lateral PNP current source transistors 79, 81, 82 and 83 in the level shift circuit 20 to cause these transistors each to pull a predetermined current therethrough as established by the values of the emitter resistors connected between the emitters of the transistors 79, 81, 82 and 83 and the bonding pad 37. At the same time, the potential present on the lead 77 is applied to the base of an NPN emitter-follower regulator transistor 85. The emitter of the transistor 85 provides a predetermined operating potential to the base of a second NPN emitter-follower transistor 87, the collector of which is connected to the bonding pad 37, and the emitter of which supplies the operating current $I_1$ to the transistor diodes 32 and 33. This operating current $I_1$ is a function of the current $\alpha^3 I_E$ due to the emitter-follower action of the transistors 87 and 85 coupled to the emitter of the transistor 72. Thus, $I_1$ equals $\alpha^3 I_E$ or $k\,\alpha^3 I_E$, where $k$ is a constant. The equation for $V_o$ then becomes:

$$V_0 = \frac{2R_L}{R_{14}R_{15}k\alpha^3 I_E}\,\frac{\beta}{\beta+3}\,V_xV_y \approx \frac{2R_L}{R_{14}R_{15}kI_E}\,V_xV_y$$

since $\alpha^3 \approx \frac{\beta}{\beta+3}$

It should be noted that a large number of lateral PNP current source transistors (7 in all) are connected to the output of the circuit 50. As a consequence, since lateral PNP transistors draw heavy base current, overloading of the positive portion of the regulator circuits 40 and 50 could result. To compensate for this, the PNP feedback transistor 72 is a substrate transistor, as previously described. Since the emitter of the PNP substrate transistor 72 is connected to the base drive lead 77 for the lateral PNP transistors, the base currents of the lateral PNP transistors are reduced by the current flowing into the emitter of the substrate PNP transistor 72 in an amount determined by the beta of the substrate PNP transistor. Typical beta for such a substrate PNP transistor is about 40 or 50, so that the possibility of overloading the regulator circuits 40 and 50 is substantially decreased.

In order to obtain the most error-free operation of the circuit, it is desirable to provide a current gain of one or unity throughout the circuits supplying the currents to the multiplier 10. If the substrate PNP transistor 72 were not used in the circuit, there would be error currents generated through the base currents of all of the lateral PNP current transistors connected to the lead 77. By employing the substrate transistor 72 to control the operation of the lateral PNP current source transistors, the current gain of the circuit is held to approximately unity gain within about one-tenth percent accuracy. This is due to the fact that the only error current which is introduced into the circuit is the base current of the substrate PNP transistor 72. This base current, however, is beta times lower than the emitter current of the substrate PNP transistor 72. Without utilizing the transistor 72, but driving the lateral PNP current sources from a standard diode-biased voltage divider, the accuracy of unity current gain of the circuit would be approximately only within 3 or 4 percent.

In the level shifting circuit 20, current from the current source transistors 79 and 81 is combined to provide a composite current $2I_2$ on a lead 91. Similarly, current from the two lateral PNP current source transistors 82 and 83 is combined to provide a composite current $2I_2$ on a lead 92, with the leads 91 and 92 each being connected to opposite halves of the level shifting circuit as the current supplies for the circuit.

The half of the level shifting circuit supplied with current over the lead 91 consists of a lateral PNP transistor 94 and an NPN transistor 95, with the collector of the transistor 95 and the emitter of the transistor 94 being connected to the lead 91 for receiving current therefrom. The circuit is completed by connecting the emitter of the transistor 95 to the base of the transistor 94 through a resistor 96, and DC operating bias for the transistors is obtained from the emitter of the NPN transistor 85 which is connected directly to the base of the transistor 95 and is connected through a capacitor 97 to the base of the transistor 94.

The combination of the lateral PNP transistor and the NPN transistor 95 operates as a positive feedback connection, with the base current of the PNP transistor being fed into the emitter of the NPN transistor which in turn operates as a grounded-base amplifier having nearly unity gain. As a result, the NPN transistor 95 supplies the PNP base current back into the emitter of the lateral PNP transistor; so that the composite behaves as if it had no loss of base current at all through the PNP transistor 94. This is due to the fact that the alpha of the NPN transistor 95 is nearly 1 (0.99 typically).

The emitter of the NPN transistor 95 is also connected to the cross-coupled collectors of the multiplier transistors 26 and 28, and the NPN current source transistors 18 and 19 connected to the differential amplifier 12 cause the differential amplifier 12 to demand a current of $I_2$ through the cross-coupled collectors of the transistors 26 and 28.

The other half of the level shifting circuit operates in the same manner as the portion just described and has been provided with the same reference numbers but with the numbers being primed. The emitter of the NPN transistor 95' then is connected to the cross-coupled collectors of the transistors 27 and 29, which draw a current of $I_2$ therefrom due to the operation of the current source transistors 18 and 19.

Thus, the current flowing through the transistors 95 and 95' is $I_2$, which means that a similar current $I_2$ must flow out of the collectors of the transistors 94 and 94' to the differential-to-single-ended converter circuit 30. This operation of the circuit causes the output of the multiplier stage 10 also to be referenced to ground through the operation of the PNP and NPN current sources supplying current to and pulling current from the level shifting circuit 20.

From an examination of the connections of the cross-coupled collectors of the transistors 26, 27, 28 and 29 to the level shifting circuit transistors 94, 95 and 94' and 95', it can be seen that there are two possible paths for the output signals of the multiplier circuit 10 to follow in arriving at the collectors of the PNP transistors 94 and 94', which form the inputs to the differential-to-single-ended converter circuit 30. One of these paths is through the emitter and collector of the NPN transistor 95 or 95' over to the emitter and through the collector of the PNP transistor 94 or 94', respectively. This is the preferred signal path.

A second signal path, however, also would exist from the base through the collector of the PNP transistor 94 or 94', but this particular path is one which subjects the signal to a large amount of phase shift due to the junction through which the signals pass. This phase shift could cause a significant amount of instability in the circuit. To prevent this instability, the resistor 96 and the capacitor 97, and the resistor 96' and capacitor 97' operate as a pair of roll-off filters to prevent high frequencies from passing through the bases of the PNP transistors 94 and 94'. As a consequence, only the desired signal path through the emitter-collector paths of the transistors 95 and 94 and the transistors 95' and 94' remains in the level shift circuit for coupling the output from the cross-coupled multiplier transistors 26, 27, 28 and 29 to the inputs of the differential-to-single-ended converter circuit.

The differential-to-single-ended converter circuit 30 is a conventional circuit, and the output signals present on the collector of the transistor 94 are connected directly to the collector of an NPN transistor 100 which also provides the output on an output bonding pad 101. Similarly the signals present on the collector of the transistor 94' are applied to the collector of an NPN transistor 102. In addition the collector of the transistor 102 is connected to the base of the transistor 100, with the emitter of the transistor 100 being connected to the base of the transistor 102 and being connected through an NPN transistor diode 104 and a resistor 105 to the bonding pad 21. The diode 104 forces a current flow to take place through the transistor 102, and the circuit interconnections compensate for base current losses. The resultant output signal appearing on the terminal 101 is a single-ended output signal corresponding to the product of the input signals $V_y$ and $V_x$ applied to the input terminals 24 and 25.

The voltage regulator circuit 40 also may be utilized to provide positive and negative offset adjustment voltages on a pair of output bonding pads 106 and 107, respectively. These offset adjustment voltages for the positive portion of the circuit are obtained by connecting the base of an emitter-follower NPN transistor 108 to the junction between the collector of the current source transistor 38 and the diode 39. The collector of the transistor 108 is connected to the bonding pad 37, with the emitter supplying current through a pair of resistors 109 and 110 and a temperature-compensating diode 111 to ground. The junction of the resistors 109 and 110 is connected to the base of an NPN transistor 112, with the collector of the transistor 112 being connected to the bonding pad 37 through a collector resistor 113, and the emitter being connected to the output bonding pad 106 to provide the positive offset adjustment voltage. The relative values of the resistors 109 and 112, of course, determine the particular value of this offset voltage.

Similarly, a negative offset voltage is obtained on the bonding pad 107 and is derived from a PNP emitter-follower transistor 115, the base of which is connected to the junction between the collector of the transistor 54 and the zener diode 53, with the emitter being connected to the ground terminal through a pair of resistors 116 and 117 and a pair of temperature compensating diodes 119 and 120.

The junction between the resistors 116 and 117 is connected to the base of an NPN transistor 124, the collector of which is connected to ground and the emitter of which is connected to the negative offset adjustment voltage bonding pad 107. The emitter of the transistor 124 also is connected to the collectors of three NPN current source transistors 126, 127 and 128, which determine the current present at the emitter of the transistor 124.

The regulated positive and negative offset adjustment voltages obtained from the bonding pads 106 and 107, respectively, may be applied to opposite ends of potentiometer circuits, the taps of which in turn can be coupled to one terminal of each pair of the input terminals 24 and 25 in order to adjust the input offset voltages for operating the multiplier circuit. Because these offset voltages are obtained from the regulated voltages established by the zener diodes 45 and 53 and the current sources 38 and 54 in the regulator circuit 40, the offset voltages are substantially independent of variations in the power supply voltages applied to the bonding pads 37 and 21. The offset voltages also are substantially independent of variations in temperature due to the temperature regulation which is provided by means of the current source transistors and the diodes connected in series with the zener diodes 45 and 53.

We claim:

1. In a monolithic integrated circuit producing an output signal in response to at least one input signal in a processing circuit, the operation of which is controlled by a current $(I)$ supplied by a current supply means, which is controlled by a control voltage, with the output of the processing circuit being dependent upon variations in the beta $(\beta)$ of the processing circuit with variations in temperature in accordance with the term $(\beta)/(\beta + k)\ I$, where $\beta$ is the current gain of the processing circuit and $k$ is a constant which is small relative to the magnitude of $\beta$, an improvement comprising: compensating means for supplying a control voltage to the current supply means, said control voltage varying in accordance with variations in the alpha $(\alpha)$ of at least one additional transistor in the compensating means to cause said current $(I)$ to vary with temperature in opposition to temperature-caused variations in the $\beta$ of the processing circuit, cancelling the effects of $\beta$ variations from the output signal produced by the processing circuit.

2. The combination according to claim 1 wherein the compensating means includes first and second voltage supply terminals; a first voltage divider including a first current source and zener diode means connected together at a junction in series between the first and second voltage supply terminals; second current source means including a first resistance means and a first transistor having base, collector, and emitter electrodes, with the base coupled with said junction and the first resistance means coupled between the emitter of the first transistor and the second voltage supply terminal, and circuit means connecting the collector of the first transistor with the first voltage supply terminal, said circuit means having therein a second junction providing said control voltage, said first transistor comprising said one additional transistor.

3. The combination according to claim 2 wherein the circuit means connecting the collector of the first transistor with the first voltage supply terminal includes a second current source transistor and at least one compensating transistor each having base, collector and emitter electrodes, the collector-emitter paths of said second current source transistor and said compensating transistor being connected together at a junction in series in the order named between the first voltage supply terminal and the collector of the first transistor with the junction between the collector-emitter paths of the compensating transistor and the second current source transistor comprising said second junction.

4. The combination according to claim 3 wherein $k=3$ and the second transistor is a lateral PNP transistor and the first transistor and the compensating transistor are NPN transistors; and further including second voltage divider means connected between the first and second voltage supply terminals with a tap on said second voltage divider means connected to the base of the compensating transistor.

5. A monolithic integrated circuit multiplier for producing an output which is a product of first and second input voltages and which is subject to variation as a result of changes in temperature including in combination:

- a first differential amplifier having first and second outputs and first and second inputs;
- a second differential amplifier having first and second outputs and first and second inputs;
- means for applying said first input signals to the first and second inputs of the first differential amplifier;
- means for applying second input signals to the first and second inputs of the second differential amplifier;
- a third differential amplifier including first and second transistors, each having base, collector, and emitter electrodes;
- a fourth differential amplifier including third and fourth transistors, each having base, collector, and emitter electrodes;
- means interconnecting the emitter electrodes of the first and second transistors with the first output of the first differential amplifier;
- means interconnecting the emitter electrodes of the third and fourth transistors with the second output of the first differential amplifier;
- first and second diode means for supplying current to the first and second outputs, respectively, of the second differential amplifier;
- means responsive to a reference voltage for supplying current to the first and second diode means;
- means for connecting the first output of the second differential amplifier with the bases of the second and third transistors;
- means for connecting the second output of the second differential amplifier with the bases of the first and fourth transistor;
- means interconnecting the collectors of the first and third transistors to provide a first multiplier output;
- means interconnecting the collectors of the second and fourth transistors to provide a second multiplier output, the output signal present on said first and second multiplier outputs being in part a function of said current supplied to the diode means and the $\beta$ of the first, second, third and fourth transistors, where $\beta$ is the current gain of said transistors;
- means for providing a reference voltage to the current supplying means; and
- means for varying said reference voltage with variations in temperature to cause the current supplied by the current supplying means to the diode means to be varied in an amount to offset variations in said output produced by variations in the $\beta$ of the first, second, third, and fourth transistors.

6. The combination according to claim 5 further including level shifting circuit means including fifth and sixth transistors, with the fifth transistor being a lateral PNP transistor and the sixth transistor being an NPN transistor, each of the fifth and sixth transistors having base, collector, and emitter electrodes;

- first current source means;
- means interconnecting the emitter of the fifth transistor and the collector of the sixth transistor with the first current source means;
- means for providing a DC biasing potential to the bases of the fifth and sixth transistors;
- means for connecting the first multiplier output with the emitter of the sixth transistor; and
- roll-off filter means connected between the emitter of the sixth transistor and the base of the fifth transistor for substantially preventing the passing of high frequency signals from the collectors of the first and third transistors through the base-collector path of the fifth transistor.

7. The combination according to claim 6 further including seventh and eighth transistors, with the seventh transistor being a lateral PNP transistor and the eighth transistor being an NPN transistor, each of the seventh and eighth transistors having base, collector, and emitter electrodes;

- second current source means;
- means interconnecting the emitter of the seventh transistor and the collector of the eighth transistor with the second current source means;
- means for providing said DC biasing potential to the bases of the seventh and eighth transistors;
- means for connecting the second multiplier output with the emitter of the eighth transistor; and
- roll-off filter means connected between the emitter of the eighth transistor and the base of the seventh transistor for substantially preventing the passing of high frequency signals from the collectors of the second and fourth transistors through the base-collector path of the seventh transistor; and
- means for obtaining output signals from the collectors of the fifth and seventh transistors.

8. The combination according to claim 5 wherein the means for varying said reference voltage includes a first constant current source coupled in series circuit between first and second voltage supply terminals, said first constant current source including first resistance means and a predetermined number of collector-emitter transistor junctions connected in series between said first resistance means and a reference junction coupled to the means for providing said reference voltage, the number of collector-emitter junctions being selected to cause variations in the reference voltage with temperature in an amount sufficient to cause corresponding variations in the current through the diode means to compensate for changes in the $\beta$ of the first, second, third and fourth transistors with temperature so that the output from the third and fourth differential amplifiers is substantially independent of said $\beta$ and, therefore, is substantially independent of variations in temperature.

9. The combination according to claim 5 wherein the first current source includes a fifth transistor having collector, base, and emitter electrodes, and the first resistance means is an emitter resistor connected between the emitter of the fifth transistor and the second voltage supply terminal and wherein the means for varying the reference voltage further includes: a second current source and zener diode means connected in series in the order named between the first and second voltage supply terminals; means connecting the base of the fifth transistor to a junction point between the second current source and the zener diode means; a third current source including second resistance means and a sixth transistor having base, collector, and emitter electrodes, with the second resistance means connected in series between the first voltage supply terminal and the emitter of the sixth transistor and the collector of the sixth transistor connected in series circuit with said predetermined number of collector-emitter paths, one of which is the collector-emitter path of the fifth transistor; and means coupled with said series circuit of said fifth and sixth transistors and said first and second resistance means for providing an operating potential for the second current source and the base of the sixth transistor, said operating potential also comprising said reference voltage.

10. The combination according to claim 9 wherein the series circuit interconnecting the collectors of the first and third current source transistors includes the collector-emitter path of at least one additional transistor, with the number of such additional transistors being selected to provide $\alpha$ compensation for the $\beta$ variations in the signal present on the first and second multiplier outputs.

11. The combination according to claim 9 wherein the fifth and sixth transistors are of opposite conductivity types.

12. The combination according to claim 11 further including first and second compensating transistors, each having base, collector, and emitter electrodes, wherein the output signal of the third and fourth differential amplifiers on the first and second multiplier outputs is expressed by the general equation:

$$V_o = (k\,R_L)/(R_x\,R_y\,I)\,(\beta)/(\beta+3)\,V_x\,V_y$$

where $V_o$ is the output voltage, $k$ is a constant, $I$ is the current flowing through the diode means, $R_L$ is the load resistor, $R_x$ and $R_y$ are degeneration resistors in the first and second differential amplifiers, $V_x$ and $V_y$ are the two input signals, with the compensation being effected by connecting the collector-emitter paths of the first and second compensating transistors in series in the order named between a first junction with the collector electrode of the sixth transistor and a second junction with the collector electrode of the fifth transistor, and further including means for providing forward biasing potential on the bases of the first and second compensating transistors, with said means for providing said operating potential being coupled with the first junction.

13. The combination according to claim 18 wherein the second current source includes a seventh transistor having base, collector and emitter electrodes and the sixth and seventh transistors are lateral PNP transistors, with the emitters thereof being connected through emitter resistors to the first voltage supply terminal and the collector of the seventh transistor being connected with the zener diode means, and further the means for providing said operating potential including a substrate PNP transistor having base, and emitter electrodes, with the base electrode thereof being connected to the first junction and the emitter electrode thereof providing said operating potential and being connected to the base electrodes of the sixth and seventh transistors.

14. The combination according to claim 13 wherein the first and second compensating transistors and the fifth transistor are NPN transistors.

15. A monolithic integrated circuit multiplier including in combination:

a first differential amplifier including first and second transistors, each of the transistors including collector, base, and emitter electrodes, the emitters of the first and second transistors being coupled together at a first input terminal;

a second differential amplifier including third and fourth transistors, each of the transistors including collector, base, and emitter electrodes, the emitters of the third and fourth transistors being coupled together at a second input terminal;

means for supplying a first input signal to the first and second input terminals;

means interconnecting the bases of the first and fourth transistors at a third input terminal;

means interconnecting the bases of the second and third transistors at a fourth input terminal;

means for supplying a second input signal to the third and fourth input terminals;

level shifting circuit means including fifth and sixth transistors, with the fifth transistor being a lateral PNP transistor and the sixth transistor being an NPN transistor, each of the fifth and sixth transistors having base, collector, and emitter electrodes;

first current source means;

means interconnecting the emitter of the fifth transistor and the collector electrode of the sixth transistor with the first current source means;

means for providing a DC biasing potential to the bases of the fifth and sixth transistors;

means interconnecting the collectors of the first and third transistors with the emitter of the sixth transistor;

roll-off filter means connected between the emitter of the sixth transistor and the base of the fifth transistor for substantially preventing the passing of the high frequency signals from the collectors of the first and third transistors through the base-collector path of fifth transistor.

16. The combination according to claim 15 further including seventh and eighth transistors, with the seventh transistor being a lateral PNP transistor and the eighth transistor being an NPN transistor, each of the seventh and eighth transistors having base, collector, and emitter electrodes;

second current source means;

means interconnecting the emitter of the seventh transistor and the collector of the eighth transistor with the second current source means;

means for providing said DC biasing potential to the bases of the seventh and eighth transistors;

means interconnecting the collectors of the second and fourth transistors with the emitter of the eighth transistor; and second roll-off filter means connected between the emitter of the eighth transistor and the base of the seventh transistor for substantially preventing the passing of high frequency signals from the collectors of the second and fourth transistors through the base-collector path of the seventh transistor; and means for obtaining output signals from the collectors of the fifth and seventh transistors.

17. The combination according to claim 16 wherein the roll-off filter means include first and second roll-off capacitors and first and second resistance means, respectively, and wherein the biasing potential is applied directly to the bases of the sixth and eighth transistors and is applied through the first and second roll-off capacitors, respectively, to the bases of the fifth and seventh transistors; the first resistance means is coupled between the base of the fifth transistor and the emitter of the sixth transistor; and the second resistance means is coupled between the base of the seventh transistor and the emitter of the eighth transistor.

* * * * *